US012200388B2

(12) United States Patent
Gao et al.

(10) Patent No.: US 12,200,388 B2
(45) Date of Patent: Jan. 14, 2025

(54) REAL GS AND OFG TIMING DESIGN FOR 1-BY-2 SHARED HDR VDGS

(71) Applicant: OMNIVISION TECHNOLOGIES, INC., Santa Clara, CA (US)

(72) Inventors: Zhe Gao, San Jose, CA (US); Tomas Geurts, Santa Clara, CA (US); Ling Fu, Union City, CA (US); Tiejun Dai, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 95 days.

(21) Appl. No.: 18/313,957

(22) Filed: May 8, 2023

(65) Prior Publication Data

US 2024/0381002 A1    Nov. 14, 2024

(51) Int. Cl.
*H04N 25/78* (2023.01)

(52) U.S. Cl.
CPC .................................. *H04N 25/78* (2023.01)

(58) Field of Classification Search
CPC ...................................................... H04N 25/78
See application file for complete search history.

(56) References Cited

U.S. PATENT DOCUMENTS

| | | | | |
|---|---|---|---|---|
| 11,997,408 B2* | 5/2024 | Cieslinski | ............. | H04N 25/65 |
| 12,108,180 B2* | 10/2024 | Miyauchi | .............. | H04N 25/79 |
| 2017/0094202 A1* | 3/2017 | Kobayashi | ............ | H04N 25/75 |
| 2017/0324917 A1* | 11/2017 | Mlinar | ................ | H04N 25/778 |
| 2021/0099659 A1* | 4/2021 | Miyauchi | ............. | H04N 25/771 |
| 2022/0321759 A1* | 10/2022 | Miyauchi | ............. | H04N 25/583 |
| 2023/0128595 A1* | 4/2023 | Cieslinski | ............. | H04N 25/78 348/230.1 |
| 2023/0353906 A1* | 11/2023 | Okino | ................... | H04N 25/69 |
| 2024/0015415 A1* | 1/2024 | Hayashi | ................ | H04N 25/44 |
| 2024/0214707 A1* | 6/2024 | Mori | .................... | H04N 25/585 |

FOREIGN PATENT DOCUMENTS

EP    1887626 A1 *    2/2008    ....... H01L 27/14603

* cited by examiner

*Primary Examiner* — Chiawei Chen
(74) *Attorney, Agent, or Firm* — PERKINS COIE LLP

(57) ABSTRACT

An imaging system includes a pixel array with odd and even pixel cells. Each of the odd and even pixel cells includes a photodiode, a floating diffusion, a transfer transistor, a reset transistor, a lateral overflow integration capacitor (LOFIC), and an overflow gate (OFG) transistor. The imaging system further includes a readout circuit with a sample and hold (SH) circuit and an analog to digital converter. The OFG transistor of each of the odd and even pixel cells is configured to direct the image charge photogenerated by the respective photodiode away from the respective transfer transistor and reduce photodiode exposure shift during LOFIC readouts during a global transfer period.

24 Claims, 4 Drawing Sheets

REAL GS AND OFG TIMING DESIGN FOR 1-BY-2 SHARED HDR VDGS

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
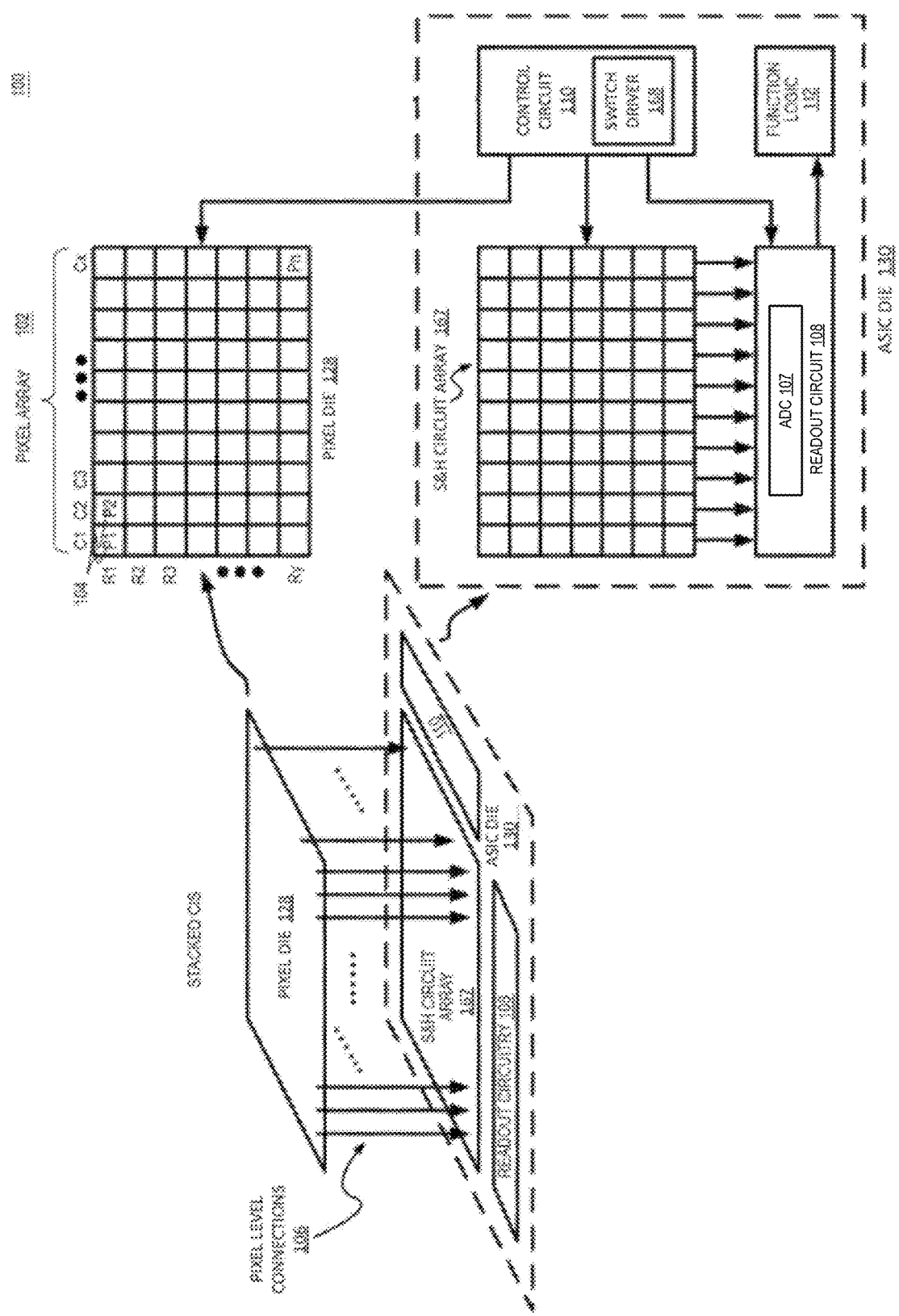
FIG. 1 illustrates one example of an imaging system in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with pixel circuits and sample and hold circuits providing reduced photodiode exposure shift for even and odd pixels are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below." "over," "under," "above." "upper," "top." "bottom," "left," "right," "center," "middle," and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with pixel circuits and sample and hold circuits providing reduced photodiode exposure shift for even and odd pixels are disclosed. In some imaging systems, photodiodes are read out on a row-by-row or a column-by-column basis (i.e., rolling shutter). When the exposure time for each row or column is not precisely synchronized, there can be photodiode exposure differences between even and odd pixels due to, for example, differences in the timing of switching transistors on and off. Photodiode exposure differences can result in noticeable artifacts in the image, such as horizontal or vertical bands of different brightness and/or color. Floating diffusion exposure shift, another type of exposure shift, can occur when there are differences in charge transfer efficiency between pixels. However, because floating diffusion sensitivity is much lower (e.g., by 100 times) than photodiode sensitivity, correcting photodiode exposure shift can be more important and fruitful than correcting floating diffusion exposure shift.

It is appreciated that circuit designs and timing diagrams in accordance with the teachings of the present disclosure reduce photodiode exposure shift to an almost negligible level for both high conversion gain (HCG) and lateral overflow integration capacitor (LOFIC) readouts.

Thus, as will be shown and described in the various examples below, an example imaging system includes a pixel array with a plurality of odd pixel cells arranged in odd rows and a plurality of even pixel cells arranged in even rows. Each of the odd and even pixel cells is configured to generate a respective image signal in response to incident light, and each of the odd and even pixel cells includes a photodiode configured to photogenerate image charge in response to image light, a floating diffusion coupled to receive the image charge from the photodiode, a transfer transistor coupled between the photodiode and the floating diffusion to transfer the image charge from the photodiode to the floating diffusion, a reset transistor coupled between a variable voltage source and the floating diffusion, wherein the reset transistor is configured to be switched in response to a reset control signal, a lateral overflow integration capacitor (LOFIC) coupled between the variable voltage source and the floating diffusion, and an overflow gate (OFG) transistor coupled between a fixed voltage source and the photodiode. The imaging system also includes a readout circuit coupled to the pixel array to readout the image charge from the pixel array. The readout circuit includes a sample and hold (SH) circuit coupled to one of the odd pixel cells, one of the even pixel cells, and one of a plurality of bitlines, and an analog to digital converter (ADC) coupled to the plurality of bitlines. The OFG transistor of each of the odd and even pixel cells is configured to direct the image charge photogenerated by the respective photodiode away from the respective transfer transistor and reduce photodiode exposure shift during LOFIC readouts during a global transfer period.

To illustrate, FIG. 1 illustrates one example of an imaging system 100 in accordance with the teachings of the present disclosure. In particular, the example depicted in FIG. 1 illustrates an imaging system 100 implemented as a CMOS image sensor (CIS) in a stacked chipped scheme that includes a pixel die 128 stacked with a logic die or application specific integrated circuit (ASIC) die 130. In the example, the pixel die 128 includes a pixel array 102, and the ASIC die 130 includes a sample and hold circuit array 167 that are coupled to the pixel array 102 through pixel level connections 106. ASIC die 130 also includes a control circuit 110, a readout circuit 108, and function logic 112. In one example, pixel array 102 is a two-dimensional (2D) array of photodiodes, or image sensor pixel circuits 104 (e.g., pixels P1, P2 . . . . Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, readout circuit 108 may be coupled to read out image data from the plurality of photodiodes in pixel array 102 through the sample and hold circuit array 167. As will be described in greater detail below, in one example, the sample and hold circuit array 167 includes a plurality of sample and hold circuits that are coupled to the pixel circuits 104 at the pixel level to sample and hold reset values as well as signal values from pixel array 102 through pixel level connections 106. The image data that is readout by readout circuit 108 may then be transferred to function logic 112. In various examples, readout circuit 108 may also include amplification circuitry, analog to digital conversion (ADC) circuitry 107 coupled to bitlines, or otherwise.

In one example, function logic 112 may simply store the image data or even manipulate the image data by applying post image effects (e.g., crop, rotate, remove red eye, adjust brightness, adjust contrast, or otherwise). In one example, readout circuit 108 may readout a row of image data at a time along readout column lines (illustrated) (i.e., bitlines between the sample and hold circuit array 167 and the readout circuit 108) or may readout the image data using a variety of other techniques (not illustrated), such as a serial readout or a full parallel readout of all pixel circuits 104 simultaneously.

In one example, control circuit 110 is coupled to pixel array 102 to control operation of the plurality of photodiodes in pixel array 102. As will also be described in greater detail below, control circuit 110 also includes a switch driver 168 that is coupled to generate the control signals to control the sample and hold circuit array 167 to sample and hold the reset voltage values and signal voltage values in the voltage domain (VD) from pixel array 102. In the depicted example, the control circuit 110 is also coupled to generate a global shutter signal for controlling image acquisition of all pixel values from the pixel array at substantially the same time, which may also be referred to as a voltage domain global shutter (VDGS). In one example, the shutter signal is a global shutter signal for simultaneously enabling all pixel circuits 104 within pixel array 102 to simultaneously capture their respective image data during a single acquisition window. In one example, image acquisition is synchronized with lighting effects such as a flash.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
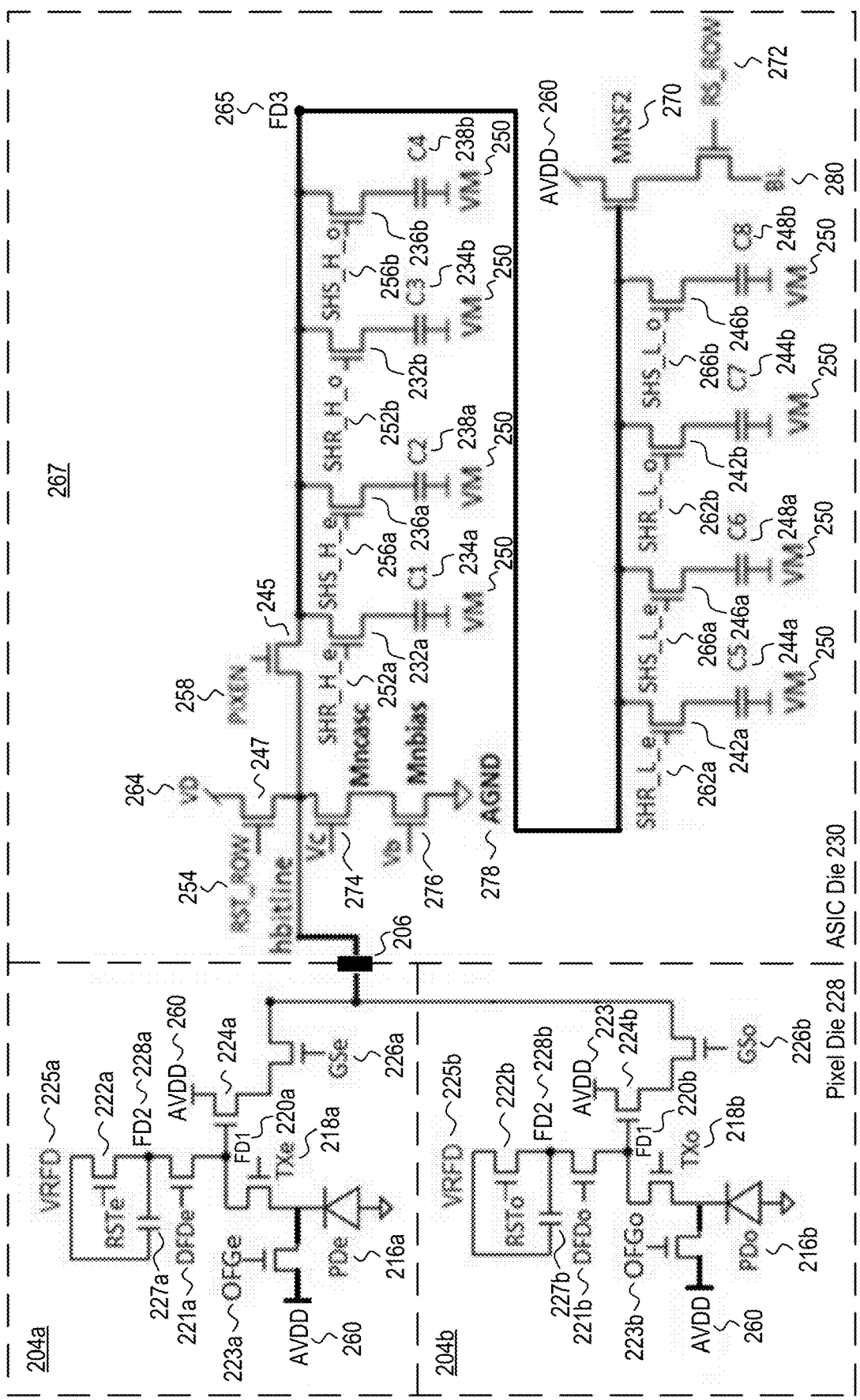
FIG. 2 illustrates a schematic of two example pixel circuits and an example sample and hold circuit in accordance with the teachings of the present disclosure.

FIG. 2 illustrates a schematic of an even pixel circuit 204a, an odd pixel circuit 204b, and an example sample and hold (SH) circuit 267 in accordance with the teachings of the present disclosure. It is appreciated that the even pixel circuit 204a, the odd pixel circuit 204b, and the SH circuit 267 of FIG. 2 may be an example of one of the pixel circuits 104 in even-numbered rows, one of the pixel circuits 104 in odd-numbered rows, and one of the SH circuits of the sample and hold circuit array 167, respectively, included in the imaging system 100 as shown in FIG. 1, and that similarly named and numbered elements described above are coupled and function similarly below.

In the illustrated example, each of the even and odd (differentiated by labels "c" and "o," or "a" and "b," respectively) pixel circuits 204a, 204b includes a photodiode 216 configured to photogenerate image charge in response to incident light. A first floating diffusion 220 is coupled to receive the image charge from the photodiode 216. A transfer transistor 218 is coupled between the photodiode 216 and the first floating diffusion 220 to transfer the image charge from the photodiode 216 to the first floating diffusion 220. A reset transistor 222 is coupled between a variable voltage source VRFD 225 and the first floating diffusion 220. The reset transistor 222 is configured to be switched in response to a reset control signal. A dual floating diffusion transistor 221 is coupled between the first floating diffusion 220 and the reset transistor 222. A second floating diffusion 228 is coupled to receive image charge from the first floating diffusion 220. A lateral overflow integration capacitor (LOFIC) 227 is coupled between the variable voltage source VRFD 225 and the first floating diffusion 220 and/or the second floating diffusion 228. A source follower transistor 224 has a gate terminal coupled to the first floating diffusion 220 and a drain terminal coupled to receive a high-voltage level AVDD 260. The source follower transistor 224 is configured to convert the image charge in the first floating diffusion 220 to an image signal, which is configured to be output through a sampling transistor 226 coupled between the source follower transistor 224 and the SH circuit 267.

Each of the even and odd pixel circuits 204a, 204b further includes an overflow gate (OFG) transistor 223 coupled between the high-voltage level AVDD 260 and the photodiode 216. As will described in further detail below with respect to FIGS. 3 and 4, the OFG transistor 223 of each of the even and odd pixel cells 204a, 204b is configured to direct the image charge photogenerated by the respective photodiode 216 away from the respective transfer transistor 218 and reduce photodiode exposure shift.

The SH circuit 267 can be coupled to both the even pixel circuit 204a and the odd pixel circuit 204b via a shared pixel level connection 206, such as a hybrid bond. In an imaging system that utilizes correlated double sampling (CDS), the charge at the first floating diffusion 220 is read out through the pixel level connection 206 after a floating diffusion reset operation in response to signals controlling the reset transistor 222 and the dual floating diffusion transistor 221 simultaneously, to obtain a reset signal. The image charge is then read out through the pixel level connection 206 after the image charge is transferred to the first floating diffusion 220 to obtain an image signal.

The SH circuit 267 includes a row reset transistor 247 coupled between a voltage buffer VD 264 and the pixel level connection 206, a cascode transistor 274 coupled between the row reset transistor 247 and ground 278, and a bias transistor 276 coupled between the cascode transistor 274 and ground 278. The row reset transistor 247 is configured to be controlled by a row reset control signal RST_ROW 254. In the depicted example, the bias transistor 276 is biased with a bias voltage Vb and serves as an SH current source, which provides current to the source follower transistor 224 through the pixel level connection 206 with a typical value of around 20 nA. An SH enable transistor 245 is configured to transfer the signal from the pixel level connection 206 to a third floating diffusion 265 in response to a SH enable control signal PIXEN 258. The third floating diffusion 265 is coupled to the gate terminal of a second source follower transistor 270. The second source follower transistor 270 is coupled between the high-voltage level AVDD 260 and a global select transistor 272, which is configured to send signals to bitline 280.

The SH circuit 267 further includes even and odd high conversion gain (HCG) reset capacitors 234a, 234b coupled between the row reset transistor 247 and an SH voltage source VM 250, even and odd HCG reset transistors 232a, 232b coupled between the row reset transistor 247 and the respective even and odd HCG reset capacitors 234a, 234b, even and odd HCG image capacitors 238a, 238b coupled between the row reset transistor 247 and the SH voltage source VM 250, even and odd HCG image transistors 236a. 236b coupled between the row reset transistor 247 and the respective even and odd HCG image capacitors 238a, 238b, even and odd LOFIC reset capacitors 244a, 244b coupled between the row reset transistor 247 and the SH voltage source VM 250, even and odd LOFIC reset transistors 242a, 242b coupled between the row reset transistor 247 and the respective even and odd LOFIC reset capacitors 244a, 244b, even and odd LOFIC image capacitors 248a, 248b coupled between the row reset transistor 247 and the SH voltage source VM 250, and even and odd LOFIC image transistors 246a. 246b coupled between the row reset transistor 247 and the respective even and odd LOFIC image capacitors 248a, 248b.

The even and odd HCG reset transistors 232a, 232b are configured to sample and hold even and odd HCG reset signals into the even and odd HCG reset capacitors 234a, 234b in response to even and odd HCG reset storage signals SHR_H_e 252a, SHR_H_o 252b, respectively. The HCG image transistors 236a, 236b are configured to sample and hold even and odd HCG image signals into the HCG image capacitors 238a, 238b in response to even and odd HCG image storage signals SHS_H_c 256a, SHS_H_o 256b, respectively. The LOFIC reset transistors 244a, 244b are configured to sample and hold even and odd LOFIC reset signals into even and odd LOFIC reset capacitors 244a. 244b in response to even and odd LOFIC reset storage signals SHR_L_c 262a, SHR_L_o 262b, respectively. The LOFIC image transistors 246a. 246b are configured to sample and hold even and odd LOFIC image signals into the even and odd LOFIC image capacitors 248a, 248b in response to even and odd LOFIC image storage signals SHS_L_e 266a, SHS_L_o 266b, respectively. The storage signals SHR_H_c 252a, SHR_H_o 252b, SHS_H_e 256a, SHS_H_o 256b, SHR_L_c 262a, SHR_L_o 262b, SHS_L_e 266a, and SHS_L_o 266b can be generated by a sample and hold driver circuitry (e.g., the switch driver 168 of the control circuit 110).

In various examples, the SH circuit 267 includes additional transistor and capacitor pairs for performing correlated multiple sampling (CMS), which can further reduce noise at the cost of a longer readout period. In various examples, the even and odd pixel circuits 204a, 204b are arranged on a pixel die 228, and the SH circuit 267 is arranged on an ASIC die 230.

Figure 3:
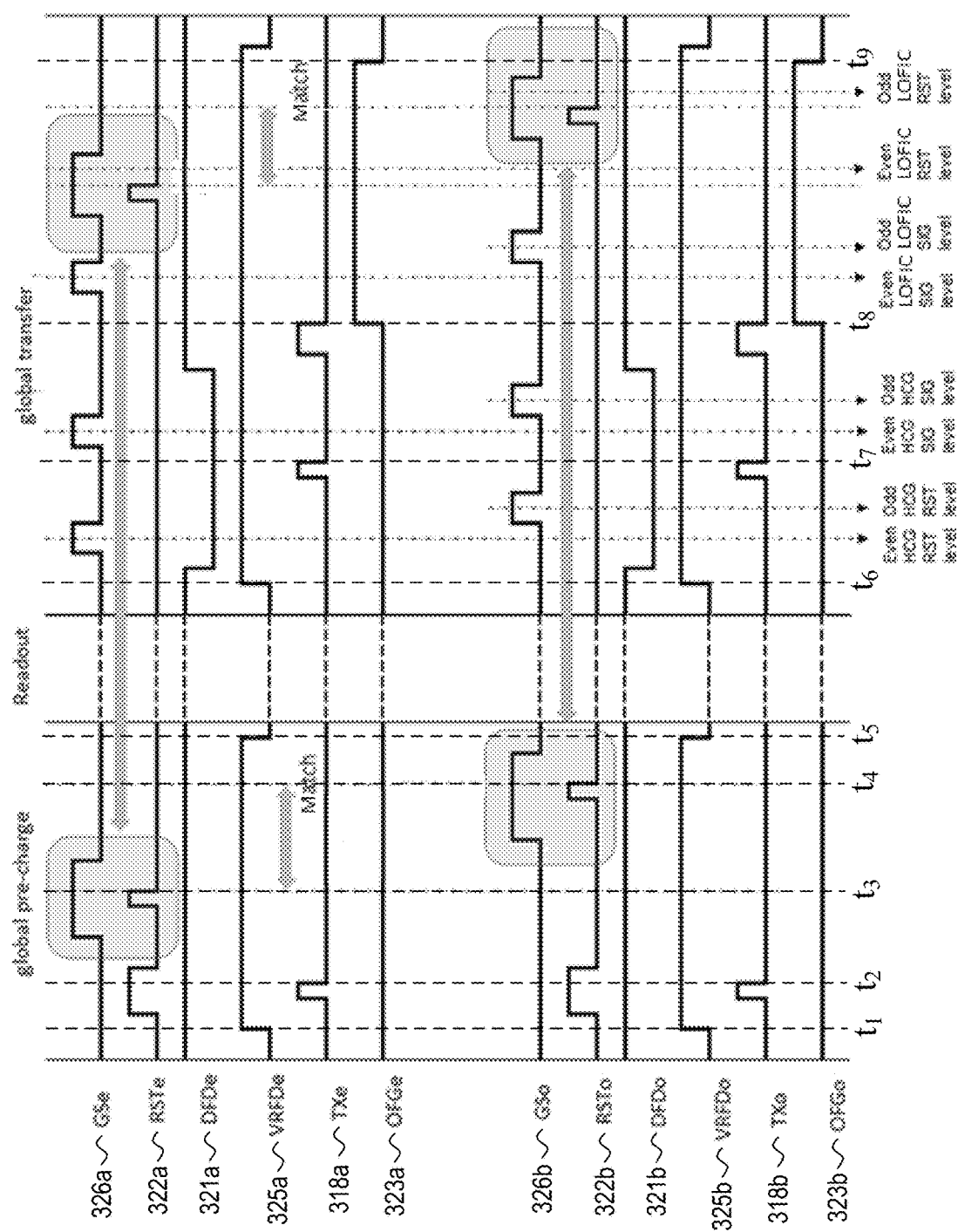
FIG. 3 illustrates a timing diagram of two example pixel circuits in accordance with the teachings of the present disclosure.

FIG. 3 illustrates a timing diagram of two example pixel circuits in accordance with the teachings of the present disclosure. The timing diagram includes a global precharge period, a readout period, and a global transfer period. It is appreciated that the timing diagram of FIG. 3 may be an example timing diagram of one of the pixel circuits 104 included in the imaging system 100 as shown in FIG. 1, and that similarly named and numbered elements described above are coupled and function similarly below.

In the illustrated example, the top half of the timing diagram depicts timing for components in an even pixel circuit and the bottom half of the timing diagram depicts timing for components in an odd pixel circuit. For each of the even and odd pixels (differentiated by labels "c" and "o," or "a" and "b." respectively), the timing diagram shows the timing of a global select signal GS 326, a reset control signal RST 322, a dual floating diffusion control signal DFD 321, a variable voltage source VRFD 325, a transfer control signal TX 318, and an overflow gate control signal OFG 323.

During the global precharge period, the even and odd dual floating diffusion control signals DFD 321 are configured to remain high, and the even and odd overflow gate control signals OFG 323 are configured to remain low. The even and odd variable voltage sources VRFD 325 are configured to switch high at around time t1. The even and odd reset control signals RST 322 and the even and odd transfer control signals TX 318 are configured to then pulse such that the falling edges of the even and odd transfer control signals TX 318 occur together at time t2. In conventional imaging systems, the global precharge period may be split into a first global precharge period for even pixel circuits and a second global precharge period for odd pixel circuits, creating a significant timing gap between even and odd pixel circuits. Therefore, by pulsing the transfer control signals 318 of the even and odd pixel circuits simultaneously, photodiode exposure shift attributable to the global precharge period is reduced, if not eliminated.

At around time t3, the global select signal GS 326a and the reset control signal RST 322a of the even pixel circuit are configured to pulse. At around time t4, the global select signal GS 326b and the reset control signal RST 322b of the odd pixel circuit are configured to pulse. While the even reset control signal RST 322a and the odd reset control signal RST 322b are not configured to pulse simultaneously the second time during the global precharge period, this merely leads to floating diffusion exposure shift between even and odd pixel circuits. Because photodiode sensitivity is significantly higher than floating diffusion sensitivity in most imaging systems (e.g., by 100 times), floating diffusion exposure shift is not obvious or apparent in most cases. At time t5, the even and odd variable voltage sources VRFD 325 are configured to switch back low.

During the readout period (e.g., a rolling readout period), image charge photogenerated by photodiodes is converted to analog voltage signals. As the illustrated timing diagram does not show the timing for components of an SH circuit (e.g., the SH circuit 267 shown in FIG. 2), details of the timing during the readout period are omitted so as not to obscure the novel aspects of the present disclosure.

During the global transfer period, high conversion gain (HCG) readouts are configured to occur prior to lateral overflow integration capacitor (LOFIC) readouts. At time t6, the even and odd variable voltage sources VRFD 325 are configured to switch high. The even and odd dual floating diffusion control signals DFD 321 are then configured to switch low, cutting off access to and from the LOFIC in preparation for the HCG readouts. Between times t6 and t7, the even and odd global select signals GS 326a, 326b are configured to pulse sequentially for HCG reset signal readouts of the even and odd pixel circuits, respectively. At around time t7, the even and odd transfer control signals TX 318 are configured to pulse simultaneously, transferring photogenerated image charge to the floating diffusion. Then, the even and odd global select signals GS 326a, 326b are configured to pulse sequentially again for HCG image signal readouts of the even and odd pixel circuits, respectively.

The even and odd global select signals GS 326a, 326b are not configured to pulse simultaneously, which can lead to photodiode exposure shift. However, the even and odd transfer control signals TX 318 are configured to pulse simultaneously at around time t2 during the global precharge period and at around time t7 during the global transfer period such that there is no photodiode exposure shift for HCG readouts. This is in contrast to conventional imaging systems in which the global transfer period is split into a first global transfer period for both HCG and LOFIC readouts of even pixel circuits, and a second global transfer period for both HCG and LOFIC readouts of odd pixel circuits. Furthermore, the even and odd transfer control signals TX 318 do not turn on and off at same time during the global pre-charge and global transfer periods, which creates a significant timing gap between even and odd pixel circuits.

After the HCG readouts, the even and odd dual floating diffusion control signals DFD 321 are configured to switch high, allowing image charge stored in the LOFICs to be read out. The even and odd transfer control signals TX 318 are then configured to pulse simultaneously such that their falling edges occur at time t8. The even and odd global select signals GS 326a, 326b are configured to pulse sequentially and twice each for LOFIC image signal and LOFIC reset signal readouts of the even and odd pixel circuits, respectively.

Similar to the HCG readouts, the even and odd global select signals GS 326a, 326b are not configured to pulse simultaneously, which can lead to photodiode exposure shift. To solve the photodiode exposure shift issue, the even and odd overflow gate control signals OFG 323 are configured to switch high at time t8 (i.e., at the falling edges of the even and odd transfer control signals TX 318). As a result, the photogenerated image charge that would have contributed to photodiode exposure shift during LOFIC readouts (e.g., image charge leaking through the transfer transistor between the even and odd LOFIC image signal readouts) are directed away from the transfer transistors and toward a high-voltage source (e.g., the high-voltage level AVDD 260 shown in FIG. 2) through overflow gate transistors (e.g., the even and odd overflow gate transistors OFGe 223a, OFGo 223b). In other words, none of the photodiode exposures contribute to the readouts once the even and odd overflow gate control signals OFG 323 are turned high and photodiode exposure is significantly reduced, if not eliminated, during LOFIC readouts.

The even and odd reset control signals RST 322 are not configured to pulse simultaneously during the global transfer period, but again, this merely leads to floating diffusion exposure shift between even and odd pixel circuits. As aforementioned, because photodiode sensitivity is significantly higher than floating diffusion sensitivity in most imaging systems (e.g., by 100 times), floating diffusion exposure shift is not obvious or apparent in most cases.

Figure 4:
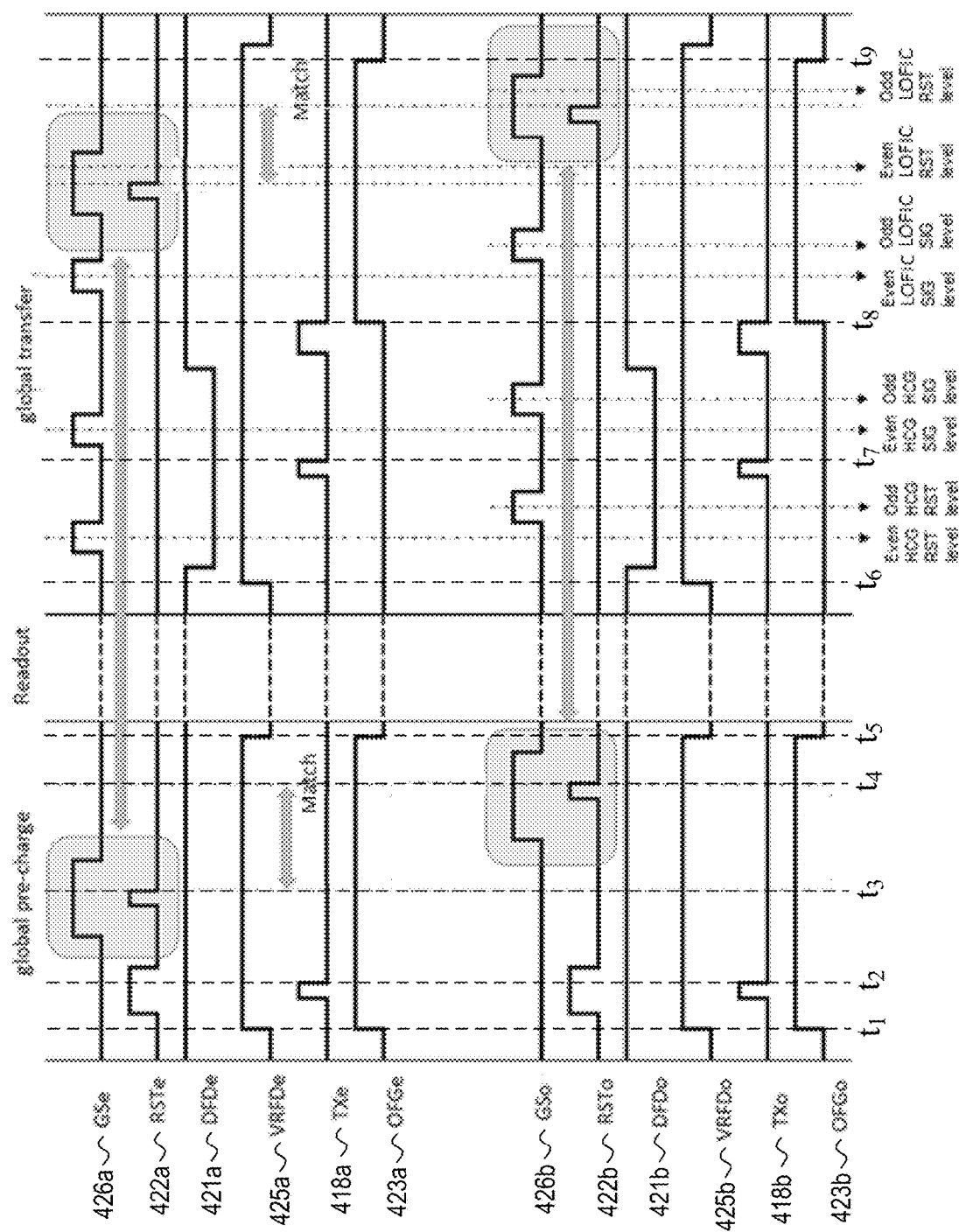
FIG. 4 illustrates a timing diagram of two example pixel circuits in accordance with the teachings of the present disclosure.

FIG. 4 illustrates a timing diagram of two example pixel circuits in accordance with the teachings of the present disclosure. The timing diagram includes a global precharge period, a readout period, and a global transfer period. It is appreciated that the timing diagram of FIG. 4 may be an example timing diagram of one of the pixel circuits 104 included in the imaging system 100 as shown in FIG. 1, and that similarly named and numbered elements described above are coupled and function similarly below.

The timing diagram illustrated in FIG. 4 is identical to the timing diagram illustrated in FIG. 3, except for the timing of the even and odd overflow gate control signals OFG 423 during the global precharge period. Therefore, the details of the other signals are not repeated so as not to obscure the novel aspects of the present disclosure embodied in FIG. 4.

In extremely bright-light conditions, photogenerated image charge can overflow from the photodiodes to the floating diffusion during the global precharge period even if the transfer transistors are off. This can be problematic because pulsing the reset control signal RST 422 will cause any such overflow charge to be lost. The amount of overflow charge lost during the precharge period can be different for the even and odd pixel circuits because although the even and odd transfer control signals TX 418 are pulsed simultaneously at t2, the even and odd reset control signals RST 422 are pulsed a second time at different times, namely at around t3 and t4, respectively.

To address this difference and reduce consequent photodiode exposure shift, the even and odd overflow gate control signals OFG 423 can be configured to simultaneously switch high at time t1 and switch back low at time t5 such that any charge that would have overflowed is redirected toward a high-voltage source (e.g., the high-voltage level AVDD 260 shown in FIG. 2) through overflow gate transistors (e.g., the even and odd overflow gate transistors OFGe 223*a*, OFGo 223*b*). As a result, light exposure to the photodiodes begins simultaneously for the even and odd pixel circuits when the even and odd overflow gate control signals OFG 423 switch low at time t5, reducing, if not eliminating, photodiode exposure shift produced during the global precharge period in extremely bright-light conditions.

While there can be differences in the amount of charge accumulated in the floating diffusions between the even and odd pixel circuits due to the different timings of the second pulses of the even and odd reset control signals RST 422, as aforementioned, photodiode sensitivity is significantly higher than floating diffusion sensitivity in most imaging systems (e.g., by 100 times) so floating diffusion exposure shift is not obvious or apparent in most cases.

In various examples, the timing diagram illustrated in FIG. 4 can be used to operate even and odd pixel circuits regardless of the brightness (e.g., even in low-light conditions) in order to, for example, have simpler and more uniform timing.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. An imaging system, comprising:
   a pixel array, including:
      a plurality of odd pixel cells arranged in odd rows; and
      a plurality of even pixel cells arranged in even rows,
      wherein each of the odd and even pixel cells is configured to generate a respective image signal in response to incident light, and
      wherein each of the odd and even pixel cells includes:
         a photodiode configured to photogenerate image charge in response to image light;
         a floating diffusion coupled to receive the image charge from the photodiode;
         a transfer transistor coupled between the photodiode and the floating diffusion to transfer the image charge from the photodiode to the floating diffusion;
         a reset transistor coupled between a variable voltage source and the floating diffusion, wherein the reset transistor is configured to be switched in response to a reset control signal;
         a lateral overflow integration capacitor (LOFIC) coupled between the variable voltage source and the floating diffusion; and
         an overflow gate (OFG) transistor coupled between a fixed voltage source and the photodiode; and
   a readout circuit coupled to the pixel array to readout the image charge from the pixel array, wherein the readout circuit includes a sample and hold (SH) circuit coupled to one of the odd pixel cells, one of the even pixel cells, and one of a plurality of bitlines,
   wherein the OFG transistor of each of the odd and even pixel cells is configured to direct the image charge photogenerated by the respective photodiode away from the respective transfer transistor and reduce photodiode exposure shift during LOFIC readouts during a global transfer period.

2. The imaging system of claim 1, wherein an OFG transistor of the one of the odd pixel cells and an OFG transistor of the one of the even pixel cells are configured to turn on simultaneously prior to the LOFIC readouts during the global transfer period.

3. The imaging system of claim 2, wherein a transfer transistor of the one of the odd pixel cells and a transfer transistor of the one of the even pixel cells are configured to be pulsed simultaneously during the global transfer period such that their falling edges align with when the OFG transistor of the one of the odd pixel cells and the OFG transistor of the one of the even pixel cells turn on.

4. The imaging system of claim 1, wherein the OFG transistor of the one of the odd pixel cells and the OFG transistor of the one of the even pixel cells are configured to turn on simultaneously at a beginning of a global precharge period and turn off simultaneously at an end of the global precharge period.

5. The imaging system of claim 1, wherein a reset transistor of the one of the odd pixel cells and a reset transistor of the one of the even pixel cells are configured to be pulsed simultaneously during a global precharge period.

6. The imaging system of claim 1, wherein a reset transistor of one of the odd pixel cells and a reset transistor of one of the even pixel cells are configured to be pulsed at different times during a global precharge period and during the global transfer period.

7. The imaging system of claim 1, wherein each of the odd and even pixel cells further includes:
   a source follower transistor with a gate terminal coupled to the floating diffusion; and
   a global select transistor coupled between the source follower transistor and the SH circuit,
   wherein a global select transistor of one of the odd pixel cells and a global select transistor of one of the even pixel cells are configured to be pulsed at different times during a global precharge period and during the global transfer period.

8. The imaging system of claim 1, wherein the transfer transistor of the one of the odd pixel cells and the transfer transistor of the one of the even pixel cells are configured to be pulsed simultaneously during a global precharge period.

9. The imaging system of claim 1, wherein a variable voltage source of the one of the odd pixel cells and a variable voltage source of the one of the even pixel cells are configured to turn on simultaneously at a beginning of a global precharge period and turn off simultaneously at an end of the global precharge period.

10. The imaging system of claim 1, wherein a variable voltage source of the one of the odd pixel cells and a variable voltage source of the one of the even pixel cells are configured to turn on simultaneously at a beginning of the global transfer period and turn off simultaneously at an end of the global transfer period.

11. The imaging system of claim 1, wherein high conversion gain (HCG) readouts of the one of the odd pixel cells and the one of the even pixel cells are performed before or after LOFIC readouts of the one of the odd pixel cells and the one of the even pixel cells.

12. The imaging system of claim 11, wherein the transfer transistor of the one of the odd pixel cells and the transfer transistor of the one of the even pixel cells are configured to be pulsed simultaneously between high conversion gain (HCG) reset signal readouts and HCG image signal readouts during the global transfer period.

13. A method of operating an imaging system, comprising:
coupling an odd pixel cell of a pixel array and an even pixel cell of a pixel array to a sample and hold (SH) circuit of a readout circuit, wherein each of the odd and even pixel cells includes a photodiode configured to photogenerate image charge in response to incident light, a floating diffusion coupled to receive the image charge from the photodiode, a transfer transistor coupled between the photodiode and the floating diffusion to transfer the image charge from the photodiode to the floating diffusion, a reset transistor coupled between a variable voltage source and the floating diffusion, wherein the reset transistor is configured to be switched in response to a reset control signal, a lateral overflow integration capacitor (LOFIC) coupled between the variable voltage source and the floating diffusion, and an overflow gate (OFG) transistor coupled between a fixed voltage source and the photodiode;
configuring the OFG transistors of the odd and even pixel cells to direct the image charge photogenerated by the respective photodiode away from the respective transfer transistor and reduce photodiode exposure shift during LOFIC readouts during a global transfer period.

14. The method of claim 13, further comprising:
configuring the OFG transistors of the odd and even pixel cells to turn on simultaneously prior to the LOFIC readouts during the global transfer period.

15. The method of claim 14, further comprising:
configuring the transfer transistors of the odd and even pixel cells to be pulsed simultaneously during the global transfer period such that their falling edges align with when the OFG transistors of the odd and even pixel cells turn on.

16. The method of claim 13, further comprising:
configuring the OFG transistors of the odd and even pixel cells to turn on simultaneously at a beginning of a global precharge period and turn off simultaneously at an end of the global precharge period.

17. The method of claim 13, further comprising:
configuring the reset transistors of the odd and even pixel cells to be pulsed simultaneously during a global precharge period.

18. The method of claim 13, further comprising:
configuring the reset transistors of the odd and even pixel cells to be pulsed at different times during a global precharge period and during the global transfer period.

19. The method of claim 13, wherein each of the odd and even pixel cells further includes:
a source follower transistor with a gate terminal coupled to the floating diffusion; and
a global select transistor coupled between the source follower transistor and the SH circuit,
and wherein the method further comprises:
configuring the global select transistors of the odd and even pixel cells to be pulsed at different times during a global precharge period and during the global transfer period.

20. The method of claim 13, further comprising:
configuring the transfer transistors of the odd and even pixel cells to be pulsed simultaneously during a global precharge period.

21. The method of claim 13, further comprising:
configuring the variable voltage sources of the odd and even pixel cells to turn on simultaneously at a beginning of a global precharge period and turn off simultaneously at an end of the global precharge period.

22. The method of claim 13, further comprising:
configuring the variable voltage sources of the odd and even pixel cells to turn on simultaneously at a beginning of the global transfer period and turn off simultaneously at an end of the global transfer period.

23. The method of claim 13, further comprising:
performing high conversion gain (HCG) readouts of the odd and even pixel cells before or after LOFIC readouts of the odd and even pixel cells.

24. The method of claim 23, further comprising:
configuring the transfer transistors of the odd and even pixel cells to be pulsed simultaneously between high conversion gain (HCG) reset signal readouts and HCG image signal readouts during the global transfer period.

* * * * *